(12) United States Patent
Planer (10) Patent No.: US 9,340,180 B2
(45) Date of Patent: May 17, 2016

(54) SUPPLEMENTAL RESTRAINT SYSTEM FOR POLICE VEHICLES

(71) Applicant: Matthew J. Planer, Sinking Spring, PA (US)

(72) Inventor: Matthew J. Planer, Sinking Spring, PA (US)

( * ) Notice: Subject to any disclaimer, the term of this patent is extended or adjusted under 35 U.S.C. 154(b) by 0 days.

(21) Appl. No.: 14/485,907

(22) Filed: Sep. 15, 2014

(65) Prior Publication Data

US 2015/0076890 A1 Mar. 19, 2015

Related U.S. Application Data

(60) Provisional application No. 61/878,447, filed on Sep. 16, 2013.

(51) Int. Cl.
*B60R 21/02* (2006.01)
*B60R 22/00* (2006.01)

(52) U.S. Cl.
CPC ........... *B60R 22/00* (2013.01); *B60R 2022/003* (2013.01)

(58) Field of Classification Search
CPC .......................... B60R 22/00; B60R 2022/003
USPC ................. 297/486–488, 464; 472/43, 59, 60
See application file for complete search history.

(56) References Cited

U.S. PATENT DOCUMENTS

| | | | | |
|---|---|---|---|---|
| 2,337,480 A * | 12/1943 | Logan | ............................. | 297/112 |
| 2,661,221 A * | 12/1953 | Bowman et al. | ............... | 280/751 |
| 3,133,746 A * | 5/1964 | Zazzara | ......................... | 280/753 |
| 3,203,733 A * | 8/1965 | Priest et al. | .................... | 297/486 |
| 3,262,716 A * | 7/1966 | Graham | ......................... | 280/751 |
| 3,400,976 A * | 9/1968 | Messier | ......................... | 297/118 |
| 3,466,091 A * | 9/1969 | De Grusso | ..................... | 297/486 |
| 3,583,761 A * | 6/1971 | Hume et al. | ................... | 297/253 |
| 3,640,572 A * | 2/1972 | Doehler | ......................... | 297/488 |
| 3,713,694 A * | 1/1973 | Miller | ........................... | 297/486 |
| 3,722,951 A * | 3/1973 | Ezquerra | ....................... | 297/488 |
| 3,819,197 A * | 6/1974 | Shakespear | ................... | 297/478 |
| 3,829,158 A * | 8/1974 | O'Connor | ..................... | 297/486 |
| 3,837,670 A * | 9/1974 | Hilyard | ......................... | 280/753 |
| 3,901,550 A * | 8/1975 | Hamy | ............................ | 297/486 |
| 3,929,349 A * | 12/1975 | Schubert | ....................... | 280/751 |
| 4,005,877 A * | 2/1977 | Humphries | ................... | 280/748 |
| 4,509,798 A * | 4/1985 | Strothers | ....................... | 297/487 |
| 4,925,246 A | 5/1990 | Corcoran | | |
| 4,995,672 A | 2/1991 | Corcoran | | |
| 5,476,309 A * | 12/1995 | Chen | ............................ | 297/487 |
| 5,499,844 A * | 3/1996 | Dirck | ............................ | 280/748 |
| 5,529,382 A * | 6/1996 | Burkat | .......................... | 297/487 |
| 5,755,235 A | 5/1998 | Magiawala | | |

(Continued)

*Primary Examiner* — Beth Stephan
(74) *Attorney, Agent, or Firm* — Miller Law Group, PLLC (57) ABSTRACT

A supplemental prisoner restraint system is mountable to the frame of a police car to secure a prisoner in a seated position. The supplemental restraint system includes a mounting plate that is secured to the frame, a restraint bar that is pivotally supported on the mounting plate for movement between a raised inoperative position and a lowered operative position, and a locking mechanism that secures the restraint bar in any selected lowered position. An actuation lever selectively releases the locking mechanism to raise the restraint bar for release of the prisoner. A spring mechanism biases the restraint bar toward a raised position so that the restraint bar can be moved upwardly while the police officer is outside of the police vehicle. The supplemental restraint system can also be utilized in an office environment in conjunction with a seating device to temporarily secure a prisoner while being processed.

20 Claims, 7 Drawing Sheets

(56) References Cited

U.S. PATENT DOCUMENTS

| | | | |
|---|---|---|---|
| 5,758,582 A * | 6/1998 | Gnezdilov | 104/241 |
| 6,299,207 B1 * | 10/2001 | Bares | 280/748 |
| D485,395 S * | 1/2004 | Mobley | D29/100 |
| 7,204,559 B2 * | 4/2007 | Berra | 297/466 |
| 7,712,200 B2 | 5/2010 | Squires | |
| 7,922,254 B2 | 4/2011 | Squires | |
| 8,308,245 B2 * | 11/2012 | Roodenburg et al. | 297/487 |
| 2002/0195868 A1 * | 12/2002 | Tsai | 297/487 |
| 2012/0068521 A1 * | 3/2012 | Roodenburg et al. | 297/487 |

\* cited by examiner

SUPPLEMENTAL RESTRAINT SYSTEM FOR POLICE VEHICLES

CROSS-REFERENCE TO RELATED APPLICATIONS

This application claims domestic priority on U.S. Provisional Patent Application Ser. No. 61/878,447, filed on Sep. 16, 2013, the content of which is incorporated herein.

FIELD OF THE INVENTION

The present invention relates generally to the transportation of prisoners in the rear seat of a police car, and more particularly, to an easily operated restraint device that prevents handcuffed prisoners from unfastening the restraint system.

BACKGROUND OF THE INVENTION

The rear seat of a police vehicle is configured for the transportation of prisoners. The conventional upholstered rear seats of an automobile vehicle are replaced by molded plastic seats that can be easily cleaned. Typically, handcuffed prisoners are placed into one of the molded plastic seat and secured by a seat belt, requiring the officer to reach across the handcuffed prisoner to reach the seat belt, pull the seat belt across the prisoner, and secure the seat belt hasp into the anchored latch. This procedure involves some risk for the officer, particularly when the prisoner is unruly, uncontrolled and/or sick. In addition, a handcuffed prisoner can reach the seat belt latch to cause the latch to release, which means that the prisoner would be unsecured in the rear seat and a safety concern.

One configuration of a molded plastic rear seat for a police vehicle is taught in U.S. Pat. No. 4,925,246, issued on May 15, 1990, and in U.S. Pat. No. 4,995,672, issued on Feb. 26, 1991, both to Dan E. Corcoran, and includes downwardly converging channels for receiving the arms of a handcuffed prisoner. U.S. Pat. No. 4,995,672 also teaches a seat belt restraint system for use with the molded contoured rear seat that includes an upper shoulder belt mounted in the sides of the vehicle that can be extended downwardly and across the handcuffed prisoner to be secured by a latch member anchored at the middle portion of the contoured seat.

A supplemental restraint system is disclosed in U.S. Pat. No. 7,712,200, granted on May 11, 2010, and in U.S. Pat. No. 7,922,254, granted on Apr. 12, 2011, both to Keith D. Squires, et al, in which a retractable strap is mounted behind a police vehicle seat to extend through the seat to be secured directly to the handcuffs of a prisoner being transported. Once the clasp is secured to the handcuffs, the strap is retracted to and locked into place to prevent the prisoner from moving out of the seat. When the prisoner is to be moved out of the seat, the locked retraction mechanism is released to allow the strap to be extended by the movement of the prisoner and the clasp released from the handcuffs.

Another form of a supplemental restraint mechanism for the transport of a prisoner is taught in U.S. Pat. No. 5,755,235, granted to Kiran B. Magiawala on May 26, 1998. In this supplemental restraint mechanism, the prisoner's feet are secured by a secondary belt located near the floor to secure the prisoner's feet and prevent the transported prisoner from kicking.

It would be desirable to provide a supplemental prisoner restraint system in which the officer securing the prisoner in the rear seat of the police vehicle would have minimal exposure to safety risks associated with the securement of the prisoner for the transportation thereof within the police car. It would also be desirable to permit a convenient release of the supplemental restraint system.

SUMMARY OF THE INVENTION

It is an object of this invention to overcome the disadvantages of the prior art by providing a supplemental prisoner restraint system that can be utilized in the back seat of a police car to secure a prisoner while the primary restraint apparatus, e. g. a seatbelt, is placed into position.

It is another object of this invention to provide a supplemental prisoner restraint apparatus that can be mounted to the conventional rear seat insert utilized on the back seat of a police car.

It is a feature of this invention that the supplemental restraint system includes a pivotal restraint bar that is movable between a raised inoperative position and a lowered operative position.

It is an advantage of this invention that the supplemental restraint system does not replace the primary passenger restraint apparatus provided on the rear seat of the police car, but operates in conjunction with it.

It is another feature of this invention that the restraint bar is freely movable from the raised inoperative to the lowered operative position.

It is another advantage of this invention that the restraint bar is locked from upward movement when placed into the lowered operative position.

It is still another feature of the invention that the supplemental prisoner restraint system has an actuation tab that can be accessed to allow the restraint bar to be selectively moved from the lowered operative position to the raised inoperative position for the release of the prisoner from the supplemental restraint system.

It is still another object of this invention to provide a supplemental restraint system that can be secured to the molded rear seat and/or to the frame of a police car in a retrofit manner so that the apparatus can be installed into substantially any pre-existing police car.

It is another feature of this invention that the supplemental restraint system includes a mounting plate that can be secured to the molded rear seat and/or to the frame of a police car to mount the system onto the rear seat thereof.

It is yet another object of this invention that the supplemental restraint system can be incorporated into the molded rear seat insert member that is conventionally utilized on the rear seats of police cars.

It is still another feature of this invention that the actuation mechanism operable to release the restraint bar is located in a position that cannot be reached by a prisoner being restrained by the supplemental restraint system, but can be accessed conveniently by a police officer.

It is still another advantage of this invention that the supplemental restraint system is easily operable both to secure a prisoner and to release a prisoner.

It is an object of this invention that the supplemental restraint system can be utilized in an office setting where temporary restraint of a prisoner is desired.

It is yet another feature of this invention that the supplemental restraint system can be installed to any frame structure in conjunction with a seating device to restrain a prisoner temporarily.

It is yet another advantage of this invention that the supplemental restraint system can secure a prisoner in the rear seat of a police car while a police officer is connecting or disconnecting the primary restraint mechanism, such as a seat belt, to further secure the prisoner on the rear seat of the police car.

It is a further advantage of this invention that the supplemental restraint system can be actuated to unlock the restraint bar while the police officer is standing outside of the vehicle by simply reaching into the vehicle to depress the actuation tab adjacent to the door of the vehicle.

It is a further feature of this invention that the restraint bar is locked at any selected lowered position without requiring the restraint bar to be moved to a pre-selected position.

It is still a further advantage of this invention that the supplemental restraint system will adapt to the size of the prisoner being restrained through the pivotal downward movement of the restraining bar to a position that prevents the prisoner from moving out of the rear seat of the police vehicle, or other seating device.

It is a further object of this invention to provide a supplemental prisoner restraint system for use in the rear seat of a police car or in conjunction with other seating devices to temporarily secure the prisoner in a seated position, in which the apparatus is durable in construction, inexpensive to manufacture, carefree of maintenance, easy to assemble, and simple and effective in use.

These and other objects, features and advantages are accomplished according to the instant invention by providing a supplemental restraint system that is mountable to a frame, such as the frame of a police car, to secure a prisoner in a seated position. The supplemental restraint system includes a mounting plate that is secured to the frame, a restraint bar that is pivotally supported on the mounting plate for movement between a raised inoperative position and a lowered operative position. A locking mechanism secures the restraint bar in any selected lowered position and includes an actuation lever for selectively releasing the locking mechanism to permit the restraint bar to be raised for release of the prisoner. A spring mechanism biases the restraint bar toward a raised position so that the restraint bar can be moved upwardly while the police officer is outside of the police vehicle. The supplemental restraint system can also be utilized in an office environment in conjunction with a seating device to temporarily secure a prisoner while being processed.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENT

Referring to the drawings, a supplemental restraint system for the restraint of a prisoner being transported in the rear seat of a police vehicle, and incorporating the principles of the instant invention, can best be seen. Any references to left, right, forward or rearward are determined by standing at the rear of the supplemental restraint mechanism and looking forward into the normal forward direction of travel of the police vehicle. It is noted that the rear portion of the supplemental restraint mechanism is connected to the frame of the police vehicle so that the rear side of the supplemental restraint mechanism is pressed against the molded plastic rear seat of the police vehicle.

Figure 10:
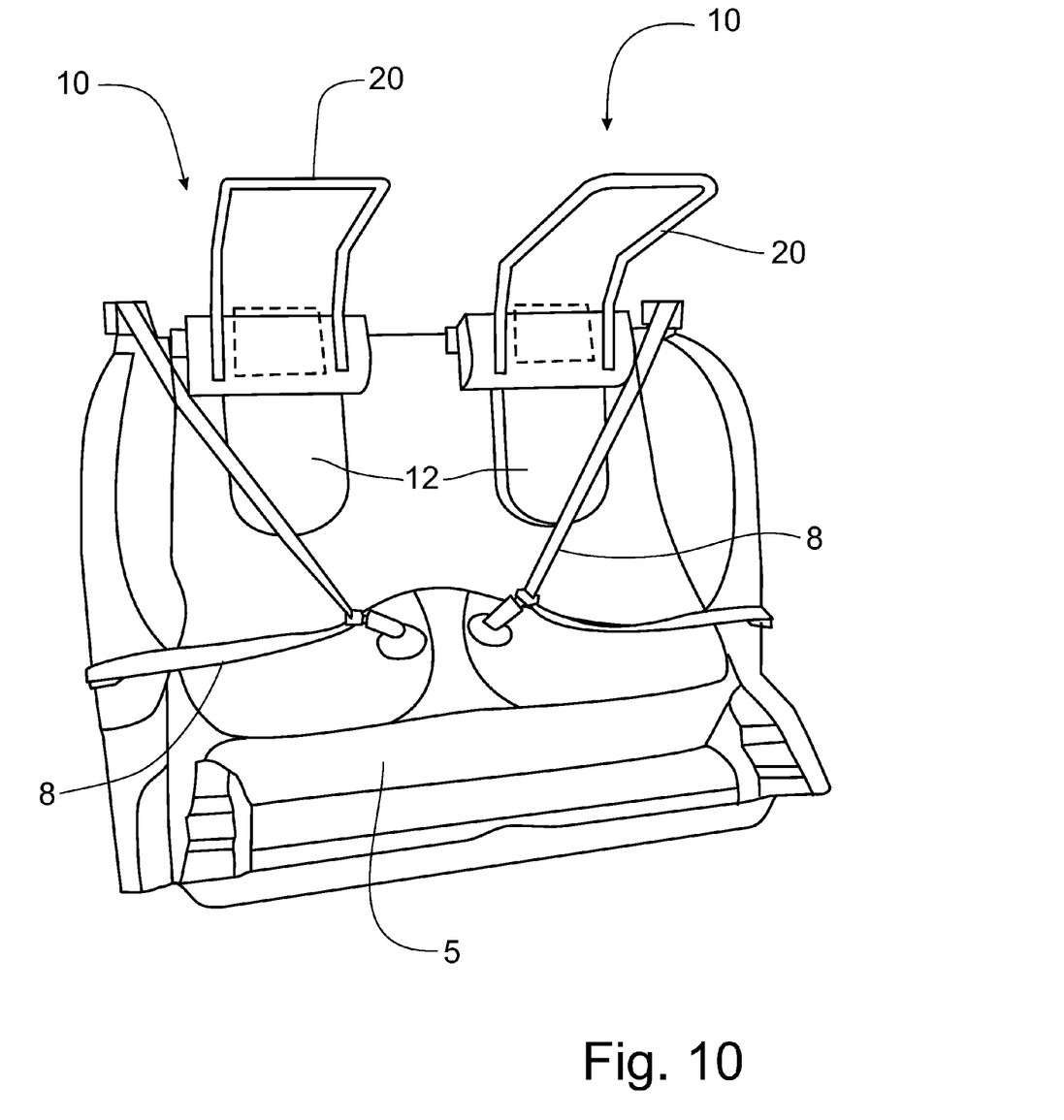
FIG. 10 is a schematic perspective view of the supplemental restraint system attached to a rear seat car insert for a police car.

The supplemental restraint mechanism 10 is adapted to be added to any existing police vehicle (not shown) or to be incorporated into the construction of the molded plastic rear seat structure so that the supplemental restraint mechanism 10 can be part of the original equipment when the molded rear seat structure is installed into a police vehicle. The primary frame 11 of the supplemental restraint mechanism 10 includes a mounting plate 12 constructed with appropriately positioned holes 13 therein for the passage of fasteners (not shown) that secure the mounting plate 12 to the frame (not shown) of the police vehicle, or to the molded rear seat 5, as depicted in FIG. 10, in order to become an integral part thereof. A locking mechanism 30 is supported on the mounting plate 12 and covered by a contoured cover 15 to keep the locking mechanism 30 secured. Preferably, the front side of the mounting plate 12 and the cover 15 are covered by a padding (not shown) for the comfort of the prisoner being transported. Typically, the mounting plate 12 is bent slightly, as depicted in FIGS. 4 and 5, to conform to the configuration of the support structure, such as the rear seat of a police vehicle.

Figure 1:
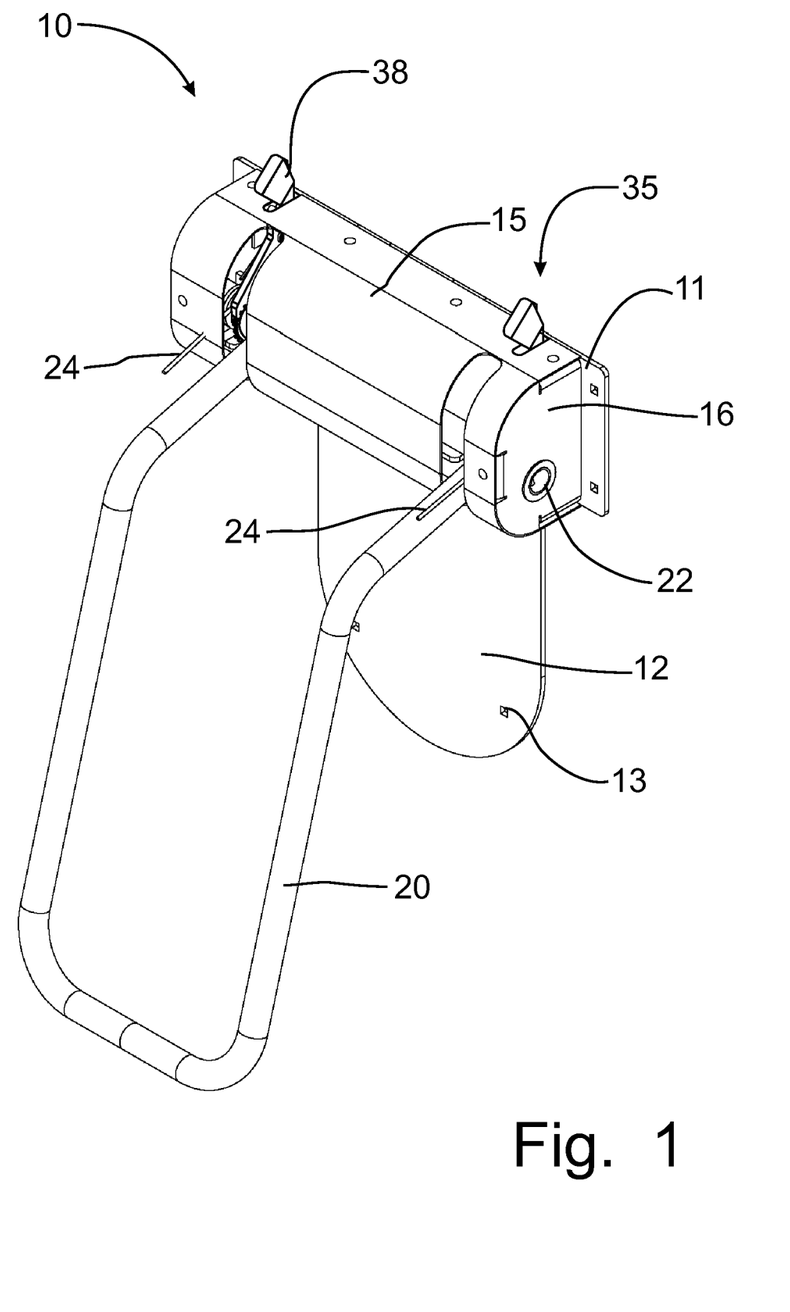
FIG. 1 is a left front perspective view of the supplemental restraint mechanism incorporating the principles of the instant invention, the restraint bar being lowered into a lowered operative position.
Figure 2:
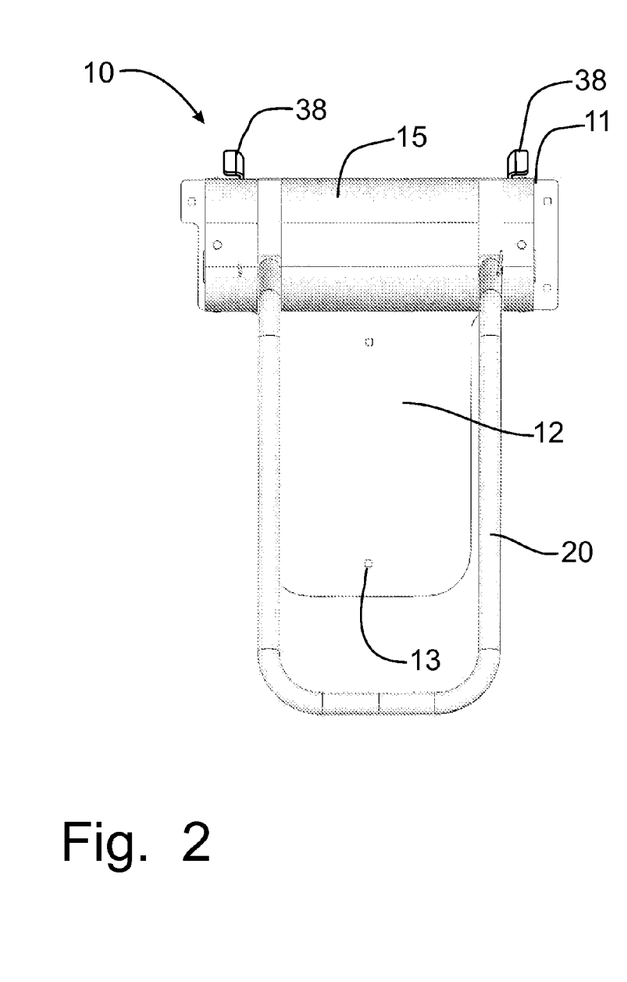
FIG. 2 is front elevational view of the supplemental restraint mechanism shown in FIG. 1.
Figure 3:
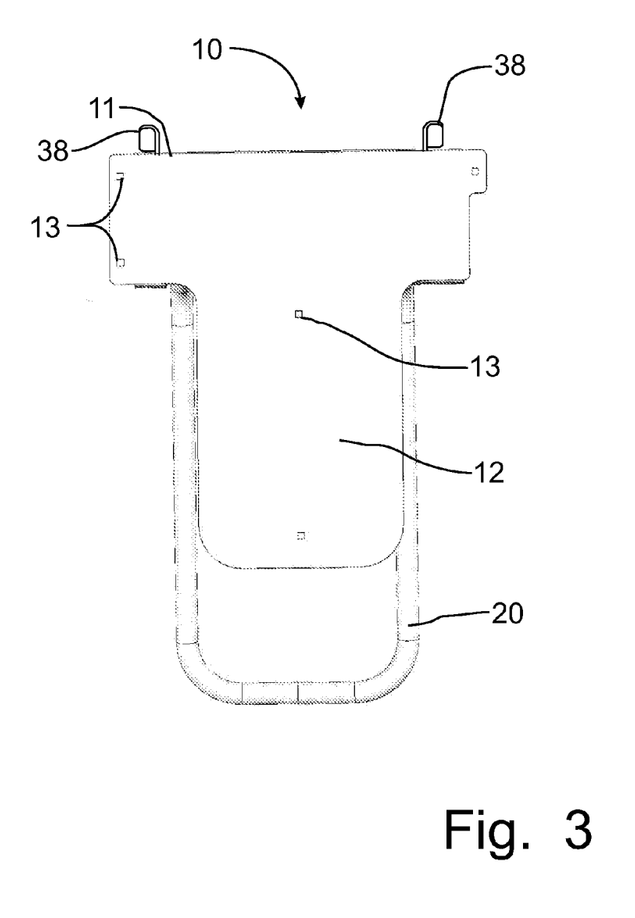
FIG. 3 is a rear elevational view of the supplemental restraint mechanism shown in FIG. 1.
Figure 4:
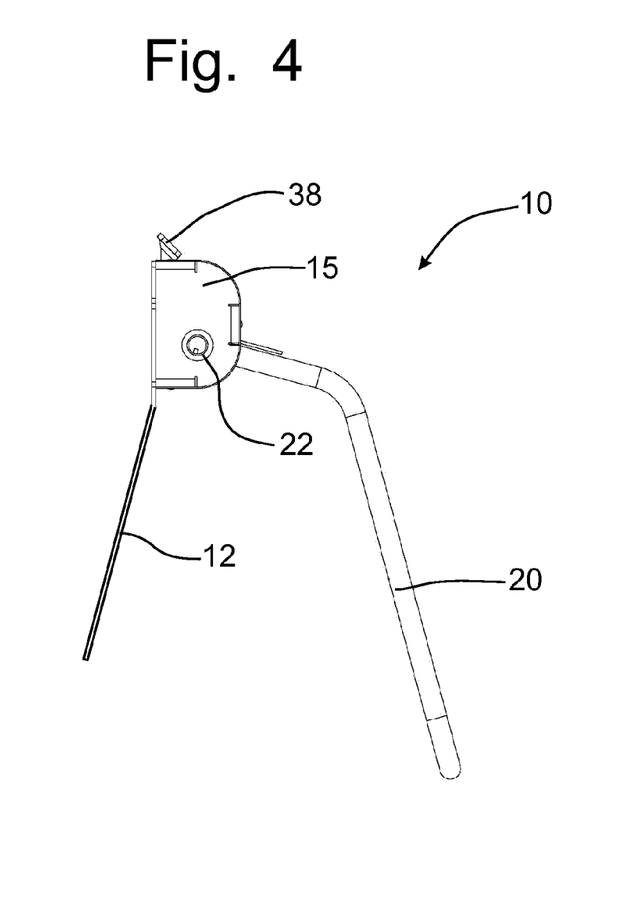
FIG. 4 is a right side elevational view of the supplemental restraint mechanism with the restraint bar being lowered into an operative position.
Figure 5:
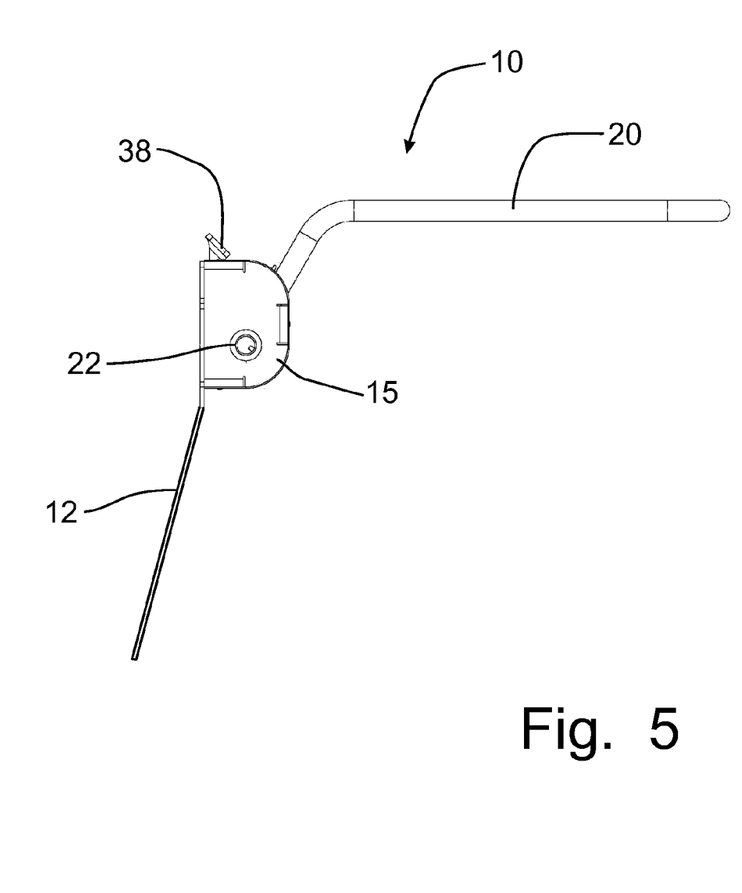
FIG. 5 is a right side elevational view of the supplemental restraint mechanism shown in FIG. 4, but with the restraint bar raised into an inoperative position.
Figure 6:
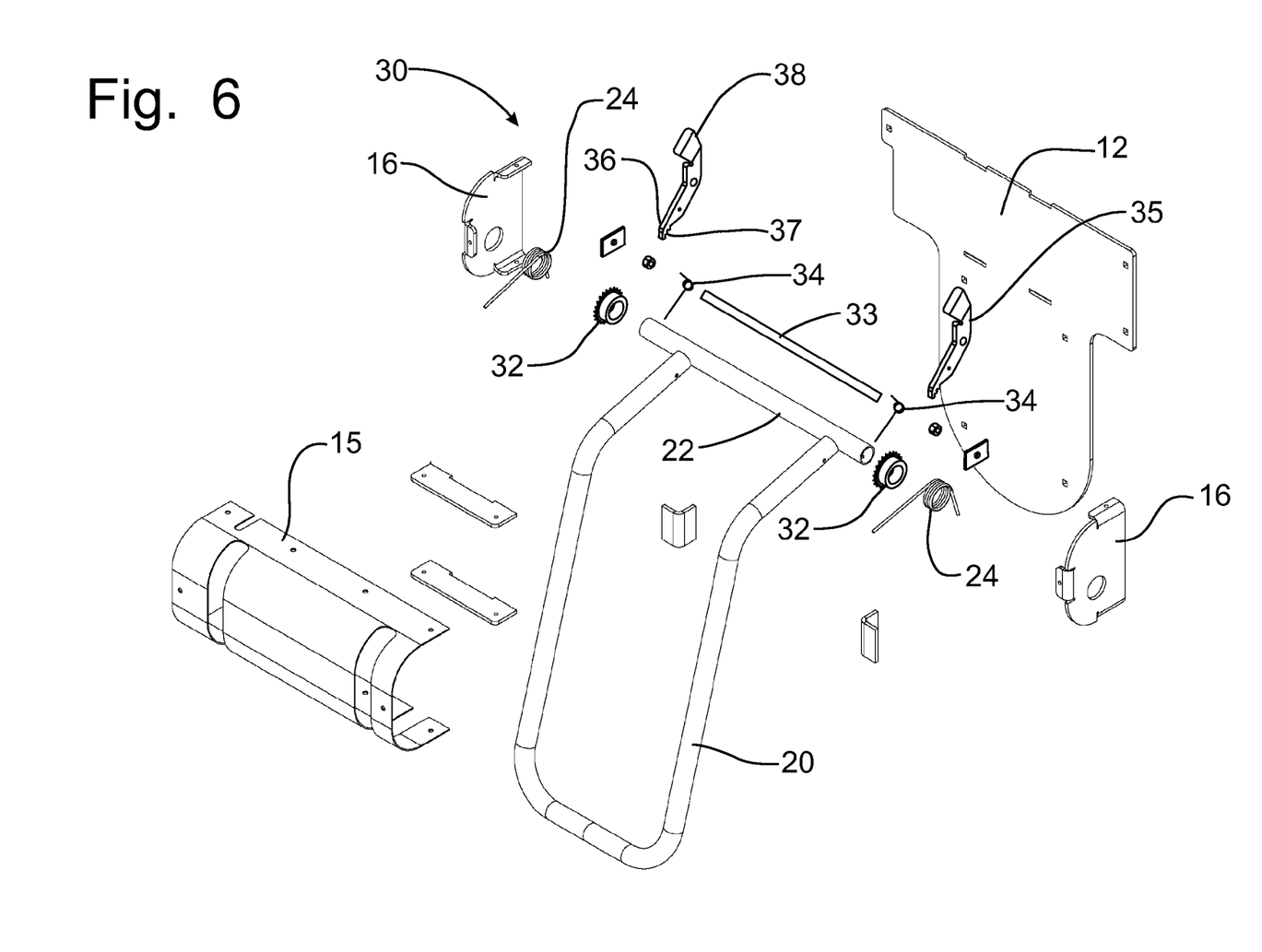
FIG. 6 is a right, front perspective exploded view of the supplemental restraint mechanism.
Figure 7:
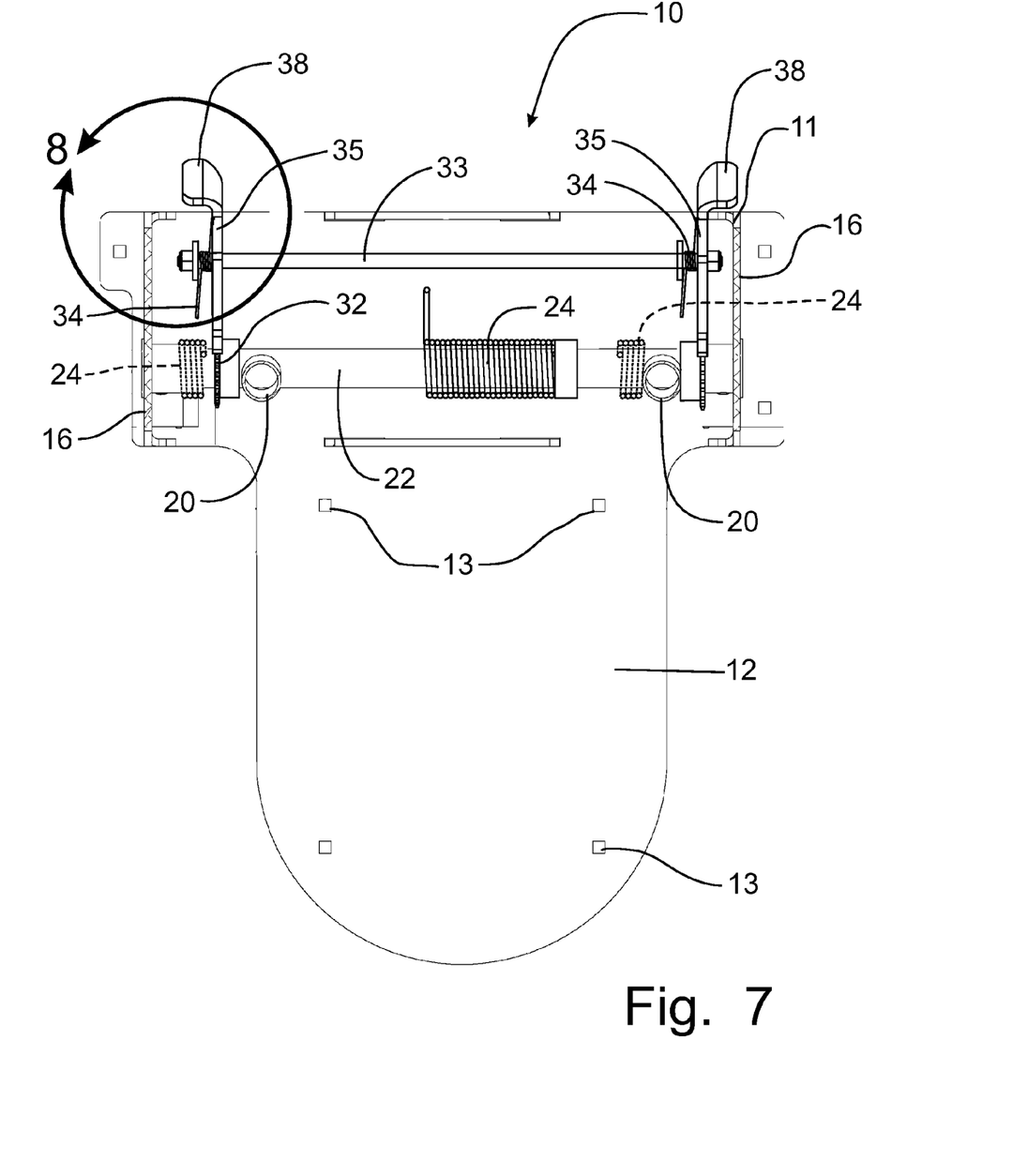
FIG. 7 is an enlarged front elevational view of the locking mechanism, the cover and restraint bar being removed for purposes of clarity.
Figure 8:
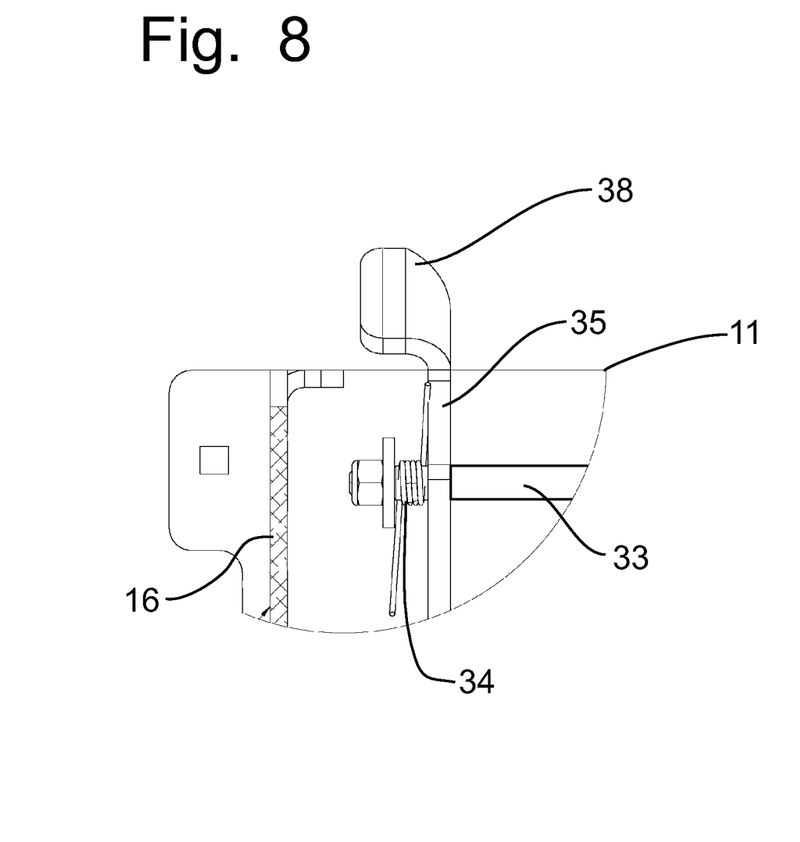
FIG. 8; is an enlarged detail view showing the front elevational view of the release latch corresponding to circle 8 of FIG. 7.
Figure 9:
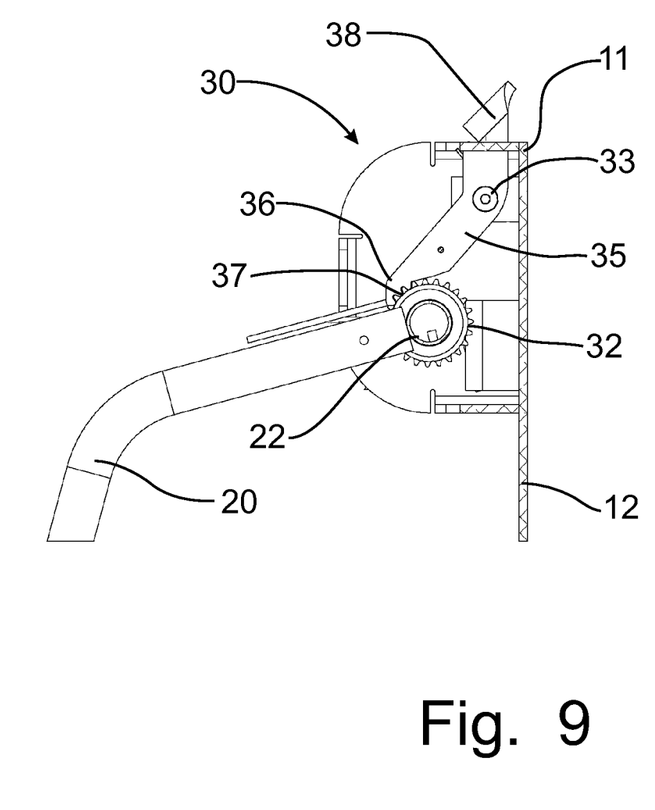
FIG. 9 is an enlarged left side elevational view of the locking mechanism shown in FIG. 7.

The supplemental restraint mechanism 10 further includes a curved restraint bar 20 that is mounted to a pivot shaft 22 journaled for rotation on the side walls 16 of the frame 11 so that the restraint bar 20 can move between a lowered operative position depicted in FIG. 4 and a raised inoperative position depicted in FIG. 5. When the restraint bar 20 is placed into the raised inoperative position, the prisoner can be placed into the seat followed by the manual lowering of the restraint bar 20 into the lowered operative position to secure the seated positioning of the prisoner, as will be described in greater detail below. The pivot shaft 22 is coupled to a pair of torsion springs 24, which can be mounted on the opposing sides of the pivot shaft 22 proximate to the respective side walls 16 of the frame 11 or mounted on the pivot shaft 22 as depicted in FIG. 7. The torsion springs 24 are secured to the pivot shaft 22 and to the frame 11 so that the lowering of the restraint bar 20 to the operative position results in the torsion springs 24 exerting an increased biasing force that urges the pivot shaft 22 to rotate in a manner that will move the attached restraint bar 20 toward the raised inoperative position.

The pivot shaft 22 is also formed with a pair of sprockets 32 affixed to opposing ends of the pivot shaft 22 so as to be rotatable with the pivot shaft 22. The locking mechanism 30 further includes a corresponding pair of release levers 35 that are pivotally mounted on the frame 11 about a rock shaft 33. The rock shaft 33 interconnects the opposing release levers 35 so that the movement of one release lever 35 results in the movement of both release levers 35. Each of the release levers 35 include a ratchet end 36 that is formed with ramped teeth 37 that are engagable with the corresponding sprocket 32. The ramped teeth 37 allow the sprocket 32 to rotate while engaged with the ratchet end 36, but only if the restraint bar 20 is being moved from the raised inoperative position toward the lowered operative position. The ramped teeth 37 prevent the upward movement of the restraint bar 20 when the ratchet end 36 is engaged with the sprocket 32. At least one torsion spring 34 is mounted on the rock shaft 33 and interconnects the frame 11 and the release lever 35 or rock shaft 33 to urge the ratchet end 36 into engagement with the sprocket 32.

The upper end of each release lever 35 is formed as an actuation tab 38 that projects above the cover 15 for ease of engagement. The actuation tab 38 is on the opposite side of the rock shaft 33 from the ratchet end 36 so that a manual depressing of one of the actuation tabs 38 against the bias exerted by the torsion spring 34 results in a pivotal movement of both of the release levers 35 about the rock shaft 33 to raise the ratchet end 36 out of engagement with the sprocket 32. The disengagement of the ratchet end 36 from the sprocket 32 allows the torsion springs 24 to move the restraint bar 20 toward the raised inoperative position. With one of the release levers 35 being located on the outside end of the frame 11, adjacent the corresponding rear car door (not shown), the release of the restraint bar 20 can be affected from outside of the vehicle without requiring the police officer to reach across the prisoner. Thus, the configuration of the supplemental restraint mechanism 10 shown in the drawings can be utilized on either the left or right side of the police vehicle.

The preferred embodiment of the supplemental restraint system 10 would include a mounting plate 12 that can be selectively mounted on the frame of the police vehicle or on the molded plastic rear seat in a retrofit manner so that this supplemental restraint system 10 can be installed into substantially any police vehicle. The mounting plate 12 may have to be formed into a shape that conforms to the molded rear seat configuration; however, attachment should only require the insertion of appropriate fasteners through the openings 13 and into substantial structure of the police vehicle, such as the frame thereof. The locking mechanism 30, pivotable restraint bar 20 and torsion springs 24 are supported on the frame 11 and mounting plate 12 and would be immediately operable upon the connection of the mounting plate 12 to the frame of the police vehicle.

Alternatively, the supplemental restraint system 10 can be incorporated into the molded plastic seat structure 5, such as depicted schematically in FIG. 10, prior to being installed into a police car so that the supplemental restraint system 10 is ready to operate as soon as the molded rear seat 5 is installed into the police vehicle in a manner having the mounting plate 12 or the frame 11 properly anchored on the vehicle frame.

As an alternative use of the supplemental restraint system 10, the mounting plate 12 can be secured to the frame of a building wall (not shown) above a seating device (not shown) that is also secured to the building frame so as to not be movable relative to the supplemental restraint system 10. In such a configuration, the prisoner can be seated on the seating device and the restraint bar 20 lowered into an appropriate lowered operative position appropriate to the size of the size of the prisoner to temporarily secure the seated position of the prisoner while paperwork is being processed, or for other reasons for which the prisoner requires temporary restraint. Other similar uses of the instant invention will become apparently to one of ordinary skill in the art upon a reading of this disclosure.

Once installed in the police vehicle, the supplemental restraint system 10 is easily operable. The prisoner is guided into a sitting position on the molded rear seat, or other appropriate seating device, and the restraint bar 20 is grasped by the police officer and pulled down from the raised inoperative position into a lowered operative position that securely traps the prisoner between the restraint bar 20 and the molded rear seat. With the ramped teeth 37 allowing a rotation of the sprockets 32 against the ratchet ends 36, the restraint bar 20 is lowered simply by pulling downwardly on the restraint bar 20. The nature of the engagement of the ratchet end 36 with the sprocket 32 allows the restraint bar 20 to be lowered to any position without fear of being raised. Accordingly, the positioning of the restraint bar 20 relative to the size of the prisoner is fully adjustable. For large prisoners, the restraint bar 20 does not have to be pulled down into a pre-established position to cause the locking mechanism to lock the restraint bar 20. Moreover, the restraint bar 20 can be pulled down lower for a smaller prisoner to secure the smaller prisoner as well as a larger prisoner.

Once lowered, the restraint bar 20 will prevent most movement of the prisoner relative to the molded rear seat. However, for the safety of the prisoner, the police officer can more safely reach across the prisoner to secure a seat belt 8, as depicted in FIG. 10, for the prisoner. One skilled in the art will note that the implementation of the seat belt 8 to secure the prisoner is independent of the operation of the supplemental restraint system 10, and that the operation of the supplemental restraint system 10 does not interfere with the operation or implementation of the seat belts 8. In the event, a prisoner is able to unlatch the seat belt 8, the supplemental restraint system 10 will continue to secure the prisoner in place on the molded rear seat 5.

To release the prisoner from the supplemental restraint system 10, the police officer need only reach to the actuation tab 38 at the top of the cover 15 on the side of the restraint mechanism 10 adjacent the outside of the vehicle. By depressing the actuation tab 38 rearwardly, the ratchet end 36 is released from the sprocket 32 allowing the torsion springs 24 to raise the restraint bar 20 toward the raised inoperative position, whereupon, the prisoner is able to move out of the molded rear seat 5 and leave the police vehicle. The seat belt 8 can be released either before or after the restraint bar 20 is moved into the raised inoperative position.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. The invention is not otherwise limited, except for the recitation of the claims set forth below.

Having thus described the invention, what is claimed is:

1. A supplemental restraint system for restraining a prisoner on a seating device, comprising:
   a frame adapted for connection to a support member associated with said seating device;
   a pivot shaft supported on said frame for pivotal movement about a generally horizontal axis;
   a restraint bar mounted on said pivot shaft for movement therewith from an upper inoperative position to a lower restraining position; and
   a locking mechanism operatively connected to said pivot shaft to lock said restraint bar in said lower restraining position, said locking mechanism including a release member that disengages said locking mechanism to permit selective movement of said restraining bar to said upper inoperative position, said release member including a pivoted release lever having a ratchet end engagable with a sprocket carried on said pivot shaft and being rotatable therewith as said restraint bar moves between said upper inoperative position and said lower restraining position.

2. The supplemental restraint system of claim 1 wherein said seating device is a chair.

3. The supplemental restraint system of claim 1 wherein said pivot shaft is coupled to a first torsion spring to bias said restraint bar toward said upper inoperative position.

4. The supplemental restraint system of claim 3 wherein said release lever is coupled to a second torsion spring to bias said ratchet end into engagement with said sprocket.

5. The supplemental restraint system of claim 4 wherein said frame includes a mounting plate detachably connecting said support member.

6. The supplemental restraint system of claim 5 wherein said seating device is a rear seat of a police car and said support member is a frame of said police car.

7. The supplemental restraint system of claim 4 wherein said locking mechanism includes a release lever on both opposing sides of said locking mechanism, said release levers being interconnected by a rock shaft so that the movement of one of said release levers results in simultaneous movement of both said release levers.

8. The supplemental restraint system of claim 7 wherein said release levers prevent the upward movement of said restraint bar from any lower restraining position.

9. The supplemental restraint system of claim 8 wherein said ratchet end of said release lever is formed with a plurality of ramped teeth that are engaged with said sprocket, said ramped teeth permitting said sprocket to rotate in one direction of rotation against said ramped teeth, but preventing said sprocket from rotating in an opposite direction of rotation.

10. A supplemental restraint system for restraining prisoners on a rear seat of a police vehicle, comprising:
    a frame adapted for connection to said police vehicle;
    a pivot shaft supported on said frame for pivotal movement about a generally horizontal axis;
    a restraint bar mounted on said pivot shaft for movement therewith from a raised inoperative position to a plurality of lowered restraining positions; and
    a locking mechanism operatively associated with said pivot shaft to lock said restraint bar in any of said lower restraining positions, said locking mechanism including at least one pivoted release lever having a ratchet end engagable with a sprocket carried on said pivot shaft and being rotatable therewith, said at least one release lever being configured to disengage said locking mechanism to permit selective movement of said restraining bar to said upper inoperative position.

11. The supplemental restraint system of claim 2 wherein said support member is a frame of a building in which said chair is located.

12. The supplemental restraint system of claim 10 wherein said ratchet end of said release lever is formed with a plurality of ramped teeth that are engaged with said sprocket, said ramped teeth permitting said sprocket to rotate in one direction of rotation against said ramped teeth, but preventing said sprocket from rotating in an opposite direction of rotation.

13. The supplemental restraint system of claim 12 wherein said pivot shaft is coupled to a first torsion spring to bias said restraint bar toward said raised inoperative position.

14. The supplemental restraint system of claim 13 wherein said frame includes a mounting plate detachably connecting said frame to said police vehicle.

15. The supplemental restraint system of claim 13 wherein said locking mechanism includes a release lever on both opposing sides of said locking mechanism, said release levers being engaged with corresponding sprockets carried on said pivot shaft, said release levers being interconnected by a rock shaft so that the movement of one of said release levers results in simultaneous movement of both said release levers.

16. The supplemental restraint system of claim 15 wherein said release levers are coupled to a second torsion spring to bias said ratchet ends into engagement with said corresponding sprockets.

17. The supplemental restraint system of claim 10 wherein said rear seat of said police vehicle includes an insert mounted to a support frame on said police vehicle, said frame being connected to said insert.

18. A supplemental restraint system for restraining prisoners in a police vehicle, comprising:
    a frame adapted for connection to said police vehicle;
    a pivot shaft supported on said frame for pivotal movement about a generally horizontal axis;
    a restraint bar mounted on said pivot shaft for movement therewith from a raised inoperative position to a plurality of lowered restraining positions, said restraint bar being biased toward said raised inoperative position; and
    a locking mechanism operatively associated with said pivot shaft to lock said restraint bar in any of said lower restraining positions, said locking mechanism including a pair of opposing release levers that disengage said locking mechanism to permit selective movement of said restraining bar to said upper inoperative position, each said release lever including a ratchet end formed with a plurality of ramped teeth that are engaged with corresponding sprockets carried on said pivot shaft, said ramped teeth permitting said sprocket to rotate in one direction of rotation against said ramped teeth, but preventing said sprocket from rotating in an opposite direction of rotation, said opposing release levers being interconnected by a rock shaft.

19. The supplemental restraint system of claim 18 wherein said pivot shaft is coupled to a first torsion spring to bias said restraint bar toward said raised inoperative position, said release levers being coupled to a second torsion spring to bias said ratchet ends into engagement with said corresponding sprockets.

20. The supplemental restraint system of claim 18 wherein a rear seat of said police vehicle includes an insert mounted to a support frame on said police vehicle, said frame being integrally connected to said insert.

* * * * *